United States Patent
Brown et al.

(10) Patent No.: US 7,904,884 B2
(45) Date of Patent: Mar. 8, 2011

(54) IDENTIFYING USE OF A RESTRICTED TERM IN A SOURCE FILE

(75) Inventors: Mark S. Brown, Austin, TX (US); Kylene J. Hall, Campbell, CA (US); Dustin Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 11/558,729

(22) Filed: Nov. 10, 2006

(65) Prior Publication Data

US 2008/0115106 A1    May 15, 2008

(51) Int. Cl.
*G06F 9/44* (2006.01)
(52) U.S. Cl. .................. 717/120; 717/143; 713/184
(58) Field of Classification Search .................. 717/120, 717/143; 713/184
See application file for complete search history.

(56) References Cited

U.S. PATENT DOCUMENTS

| 7,568,109 | B2 * | 7/2009 | Powell et al. ................ 713/187 |
| 2003/0028651 | A1 * | 2/2003 | Schreckengast et al. ..... 709/229 |
| 2005/0216898 | A1 * | 9/2005 | Powell et al. ................ 717/141 |
| 2008/0040776 | A1 * | 2/2008 | Bauer et al. ...................... 726/3 |

* cited by examiner

*Primary Examiner* — Wei Y Zhen
*Assistant Examiner* — Phillip H Nguyen
(74) *Attorney, Agent, or Firm* — Dillon & Yudell LLP

(57) ABSTRACT

A method of data processing that converts a set of restricted terms, which is considered prohibited for use in source files, into an encrypted form, which prevents unauthorized users from reading the set of restricted terms. Further, the terms from a selected source file are encrypted with the same algorithm that was used on the set of prohibited terms. Then, a determination is made if the selected source file has one or more of the encrypted, restricted terms. In response to determining that the selected source file has one or more of the encrypted, restricted terms, an indication is given that the selected source file has one or more of the encrypted, restricted terms.

9 Claims, 3 Drawing Sheets

IDENTIFYING USE OF A RESTRICTED TERM IN A SOURCE FILE

BACKGROUND OF THE INVENTION

1. Technical Field

The present invention relates generally to data processing systems and in particular to processing files utilizing a data processing system. Still more particularly, the present invention relates to a method, system, and program product to identify the use of one or more restricted terms in a source file stored on a data processing system.

2. Description of the Related Art

Data processing systems vary greatly in both size and complexity. However, generally, data processing systems require both hardware and software components to operate. In addition to the basic hardware components, such as the processor and memory, and software components, such as the operating system (OS) and application programs, typical systems also include user interface devices that allow a user to interact with the system, data storage devices that allow a user to store data and/or program code, and a communication adapter that supports data communication between data processing systems.

Source files are commonly found on data processing systems. These files are text files which are written in a computer language. When translated, through a process called compilation, one or more source files become a set of one or more executable files for a target data processing platform. In some cases, the source files for a set of executable files are released along with the executable files. In that case, those source files need to be checked for references to terms that are considered restricted.

Unfortunately, in many large application programs today, there are thousands of source files, each with hundreds or thousands of lines of code. This makes it impractical to check each of these source files manually for prohibited references. Moreover, a conventional automated process for checking the source files would undesirably require the generation and/or distribution of a file containing the restricted terms, a violation of the very intent of checking for restricted terms.

Based on the foregoing, the present invention recognizes that it would be desirable to provide a method, system and program product to identify the use of one or more restricted terms in a source file. These and other benefits are provided by the invention described herein.

SUMMARY OF THE INVENTION

Disclosed are a method, system and program product for identifying the use of restricted terms in source code without revealing the restricted terms. According to one embodiment, a set of restricted terms, which may include proprietary or copyrighted terms, is encrypted with a one way encryption scheme. After the set of encrypted terms is generated, a source file is selected to test for restricted terms. The selected source file is parsed into terms, and each term is encrypted using the same one way encryption scheme used on the set of restricted terms. A comparison of the encrypted source file terms and the set of encrypted restricted terms is then performed to determine if the selected source file contains any of the restricted terms. In response to determining that the selected source file has a restricted term, the use of the term is flagged.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
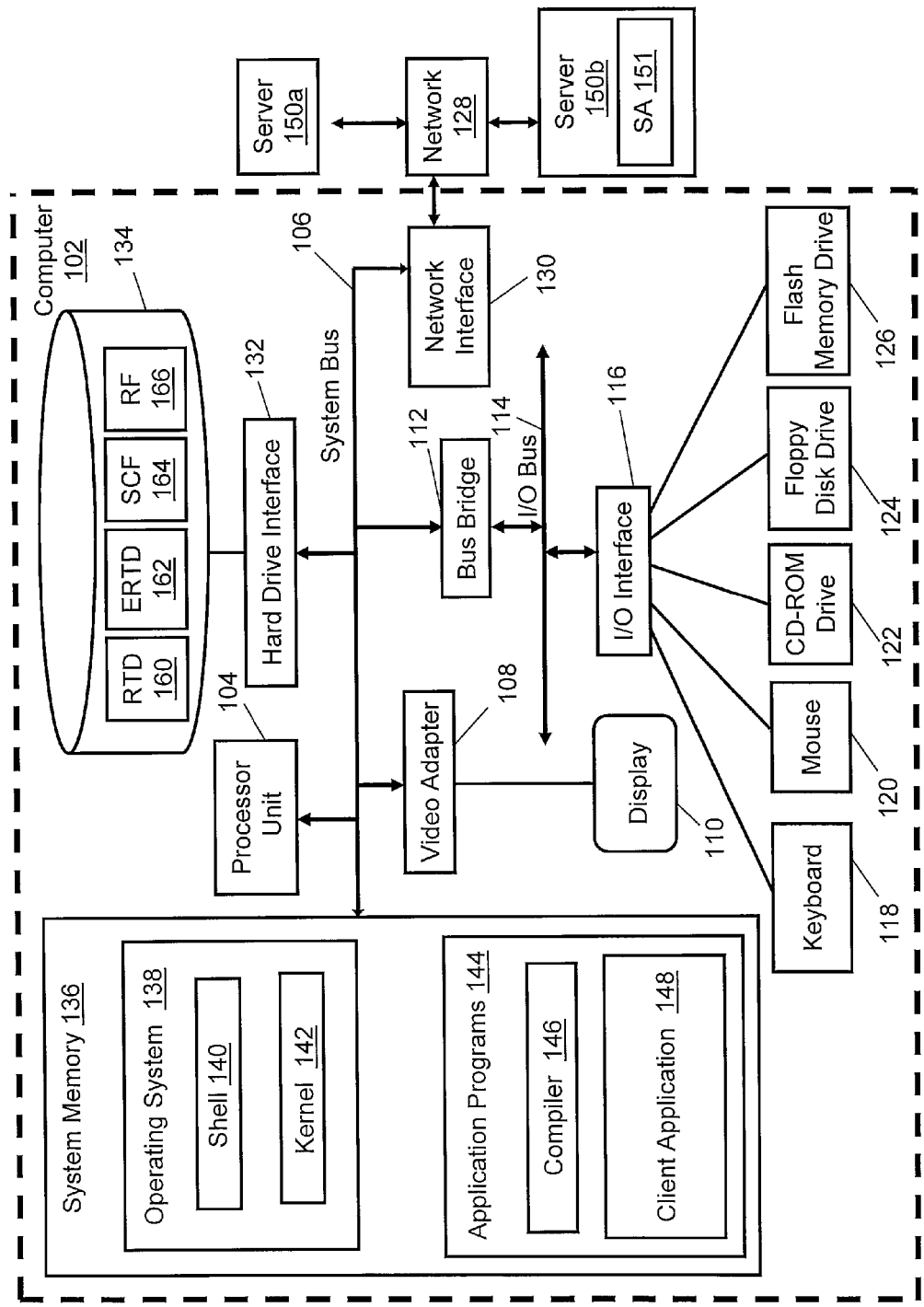
FIG. 1 depicts a high level block diagram of an exemplary data processing environment in accordance with the present invention.

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, and so forth.

The present invention provides a method, system, and computer program product for identifying the use of restricted terms in source code without revealing the list of restricted terms itself. The present invention is preferably executed on a data processing system such as the exemplary data processing system illustrated in FIG. 1 and described below. The present invention finds applicability on data processing systems irrespective of the specific hardware and software architecture employed.

With reference now to FIG. 1, there is depicted a block diagram of an exemplary data processing system environment in accordance with the present invention. As depicted, the data processing system environment includes a computer 102, which may be a server, desktop or laptop personal computer, handheld computer, workstation, or other data processing system. Computer 102 includes a processor unit 104 coupled to a system bus 106. System bus 106 is further coupled to a video adapter 108 that drives display 110 and to a bus bridge 112 that couples system bus 106 to Input/Output (I/O) bus 114. An I/O interface 116 coupled to I/O bus 114 affords communication with various I/O devices, including keyboard 118, mouse 120, Compact Disk—Read Only Memory (CD-ROM) drive 122, floppy disk drive 124, and flash drive memory 126. The format of the ports connected to I/O interface 116 may be any known to those skilled in the art of computer architecture, including but not limited to Universal Serial Bus (USB) ports.

Hard drive interface 132 is also coupled to system bus 106. Hard drive interface 132 interfaces with a hard drive 134 that provides non-volatile storage for instructions and data. In a preferred embodiment, hard drive 134 populates system memory 136, which is also coupled to system bus 106. System memory is defined as a lowest level of volatile memory in computer 102. This volatile memory may include additional higher levels of volatile memory (not shown), including, but not limited to, cache memory, registers, and buffers. Program code that populates system memory 136 includes operating system (OS) 138 and application programs 144.

OS 138 includes shell 140, for providing transparent user access to resources such as application programs 144. Generally, shell 140 (as it is called in UNIX®) is a program that provides an interpreter and an interface between the user and the operating system. As depicted, OS 138 also includes kernel 142, which includes lower levels of functionality for OS 138. Kernel 142 provides essential services, such as memory management, process and task management, disk management, and mouse and keyboard management, which are required by other parts of OS 138 and application programs 144. In the depicted embodiment, application programs 144 include a compiler 146 that includes program modules and instructions enabling computer 102 to compile source files into an executable form. Application programs 144 in system memory 136 also include a client application 148.

Computer 102 is able to communicate and exchange data with a plurality of servers 150a and 150b via network 128 (e.g., the Internet or an intranet) using network interface 130, which is coupled to system bus 106. Servers 150 may be realized as general-purpose data processing systems like computer 102 or may be alternatively be implemented with special purpose data processing hardware, as known to those skilled in the art. One or more servers 150 execute server application (SA) 151.

The hardware elements depicted in computer 102 are not intended to be exhaustive, but rather represent and/or highlight certain components that may be utilized to practice the present invention. For instance, computer 102 may include alternate memory storage devices such as magnetic cassettes, Digital Versatile Disks (DVDs), etc. These and other variations are intended to be within the spirit and scope of the present invention.

Figure 2:
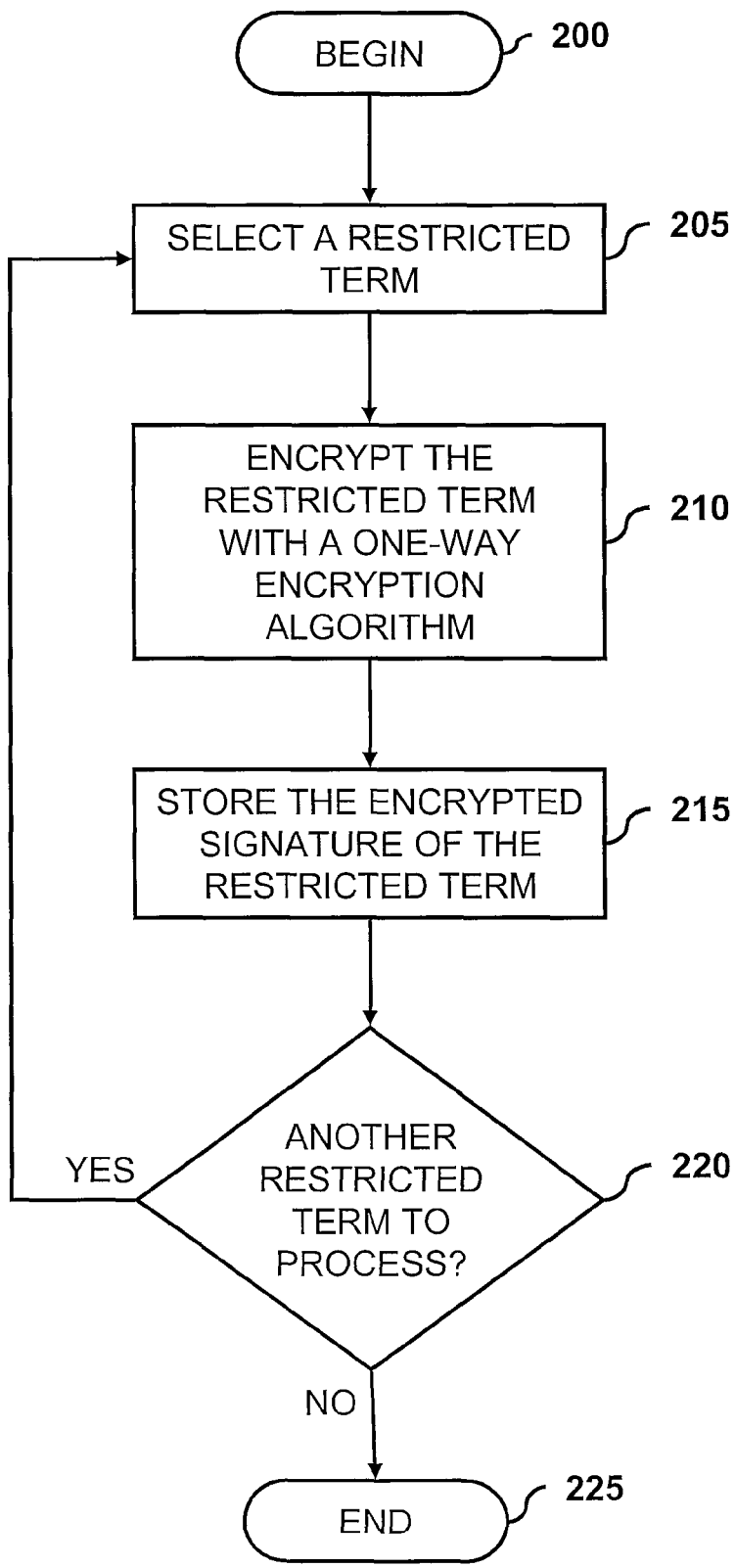
FIG. 2 is a high level logical flowchart of the process by which a set of restricted terms can be converted into a set of encrypted signatures in accordance with one embodiment of the invention.

With reference now to FIG. 2, there is illustrated a high level logical flowchart of an exemplary method of generating a set of encrypted, restricted terms in accordance with the present invention. In the following description, the depicted method is discussed with reference to a client application 148. However, those skilled in the art will appreciate that the exemplary method may alternatively or additionally be performed by a server application 151.

As illustrated, the process of generating a set of encrypted, restricted terms begins at block 200, for example, in response to user selection of a menu option to generate an Encrypted Restricted Terms Database (ERTD) from a menu presented by client application 148 or in response to a user entering a command to generate an ERTD at a command line. In either case, the user preferably specifies a Restricted Terms Database (RTD) 160 that contains a set of restricted terms to be identified in a source code file 164. Following block 200, the process proceeds to block 205, which illustrates client application 148 selecting a next restricted term to be processed, such as the name of a proprietary function, from RTD 160. Following block 205, the process proceeds to block 210, which illustrates client application 148 encrypting the selected term using a one-way encryption algorithm (commonly known as a hashing algorithm). Exemplary one-way encryption algorithms that may be utilized include SHA-1, Blowfish, and MD5. Following block 210, the process proceeds to block 215, which illustrates client application 148 storing the encrypted restricted term in ERTD 162 for later use. Client application 148 then determines, at block 220, whether or not another restricted term within RTD 160 remains to be processed. If so, the process returns to block 205, which has been described. If not, the process terminates at block 225. Once ERTD 162 is built, ERTD 162 can be distributed to another computer or human user without revealing the restricted terms.

Figure 3:
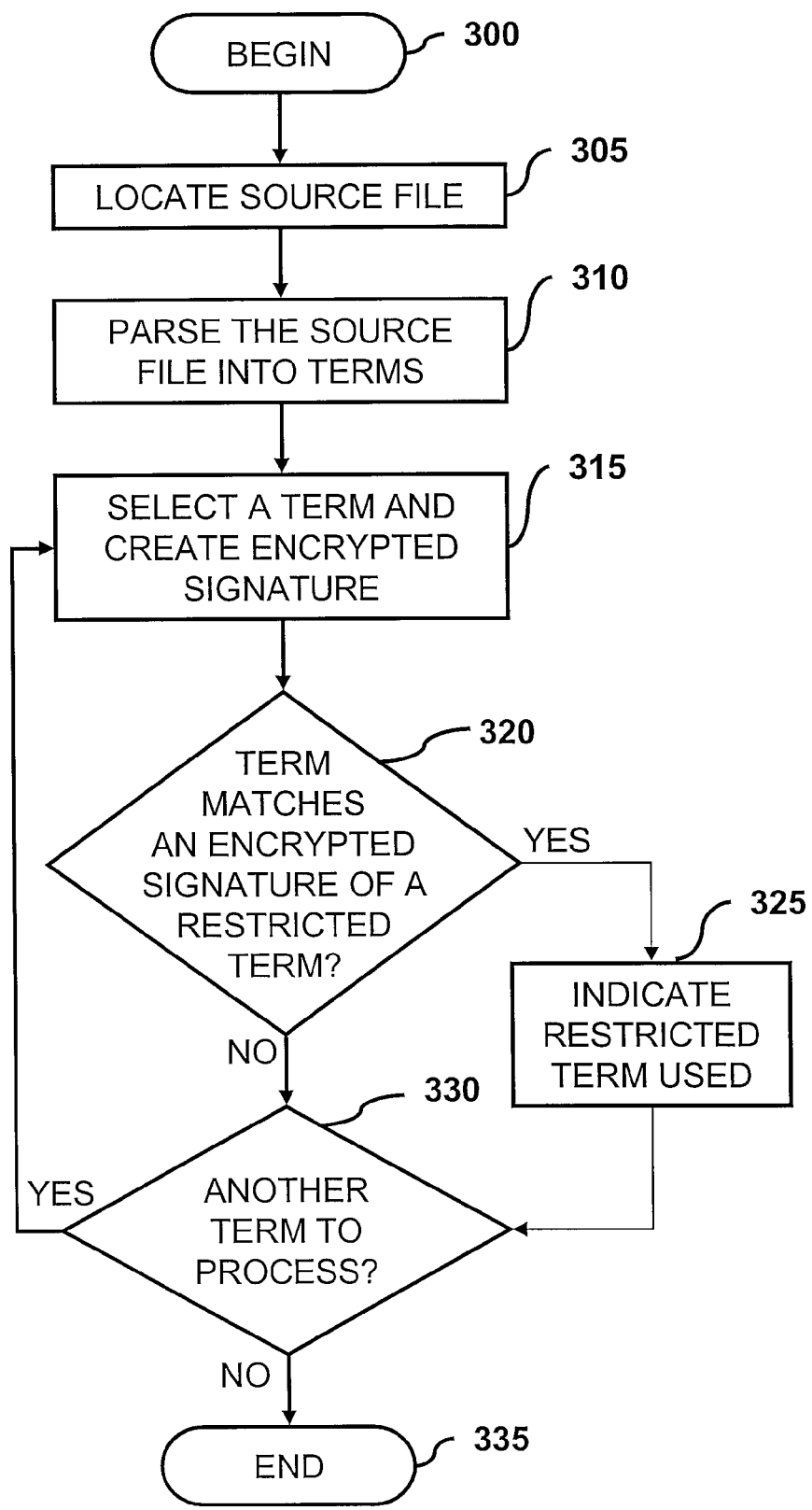
FIG. 3 is a high level logical flowchart of the process by which a source file can be checked for a set of restricted terms in accordance with one embodiment of the invention.

With reference now to FIG. 3, there is illustrated a high level logical flowchart of an exemplary method of checking a selected source file, such as Source Code File (SCF) 164, for restricted terms in accordance with the present invention. In the following description, the depicted method is discussed with reference to client application 148. However, those skilled in the art will appreciate that the exemplary method may alternatively or additionally be performed by server application 151.

As illustrated, the process of checking a selected source file for restricted terms begins at block 300, for example, in response to user selection of a "Scrub Source" option in a menu presented by client application 148 or in response to user entry of a "Scrub Source" command at a command line. In either case, the user preferably designates a source file to be processed, such as SCF 164. Following block 300, the process proceeds to block 305, which illustrates client application 148 locating the specified source file within data storage (e.g., hard disk 134). Following block 305, the process proceeds to block 310, which illustrates client application 148 parsing the plain text within SCF 164 into individual terms.

Following block 310, the process proceeds to block 315 and following blocks, which depicts client application 148 looping through the terms identified within SCF 164 to identify any restricted terms appearing in SCF 164. As indicated at block 315, client application 148 selects a next term to be processed and encrypting it using the one-way encryption algorithm employed to generate ERTD 162. Next, at block 320, client application 148 compares the encrypted term from SCF 164 with the entries in ERTD 162 to determine if the encrypted term identically matches any of the encrypted, restricted terms within ERTD 162. If not, the process proceeds to block 330, which is described below.

If, however, client application 148 determines at block 320 that a restricted term has been used, the process proceeds to block 325, which illustrates client application 148 providing an indication that SCF 164 includes the restricted term. For example, client application 148 may decrypt the encrypted restricted term and enter the restricted term in plain text in result file 166, optionally in association with an indication of a location of the restricted term in SCF 164. Alternatively or additionally, client application 148 may present the restricted term in plain text within display 110. Following block 325 (or following a negative determination at block 320), the process proceeds to block 330, which illustrates client application 148 determining if there is another term within SCF 164 that remains to be processed. If so, the steps indicated by blocks 315-330 are repeated iteratively until all terms have been processed, as indicated by the process returning from block 330 to block 315. Thereafter, the process terminates at block 335. As will be appreciated, the entire process shown in FIG. 3 may also be performed iteratively for a plurality of source files.

As has been described, the present invention provides a method, system and program product that supports identification of the use of one or more restricted terms in a source file stored on a data processing system. According to the one embodiment, each of a plurality of restricted terms is encrypted utilizing a one-way function to obtain a set of encrypted restricted terms. A plain text source file is parsed to identify a plurality of source file terms and each of the plurality of source file terms is encrypted to obtain a plurality of encrypted source file terms. The plurality of encrypted source file terms and the set of encrypted restricted terms are compared to determine if the source file contains any of the plurality of restricted terms. If so, the restricted term(s) contained in the source file are reported. Advantageously, once the set of encrypted restricted terms (e.g., ERTD) is obtained, the set of encrypted restricted terms can be distributed to one or more remote computer systems (e.g., servers 150a-150b)

without divulgation of the restricted terms in plain text so that the remote computer systems can process one or more source files.

While the invention has been particularly shown and described with reference to a preferred embodiment, it will be understood by those skilled in the art that various changes in form and detail may be made therein without departing from the spirit and scope of the invention. For example, although an illustrative embodiment of the present invention has been described in the context of a fully functional computer system with installed program code, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of suitable media include storage media such as thumb drives, floppy disks, hard drives, CD-ROMs, DVDs, and transmission media such as digital and analog communication links

What is claimed is:

1. A method of data processing, said method comprising:
   encrypting each of plurality of restricted terms utilizing a one-way function to obtain a set of encrypted restricted terms;
   parsing plain text within a source file to identify a plurality of source file terms;
   encrypting each of the plurality of source file terms utilizing the one-way function to obtain a plurality of encrypted source file terms;
   comparing the plurality of encrypted source file terms and the set of encrypted restricted terms to determine if the source file contains any of the plurality of restricted terms; and
   in response to determining by the comparing that the source file contains at least one restricted term among the plurality of restricted terms, reporting the at least one restricted term contained in the source file, wherein said reporting includes entering in a result file in plain text the at least one restricted term contained in the source file but not others of the plurality of restricted terms and including in the result file an indication of one or more locations of the at least one restricted term in the source file.

2. The method of claim 1, wherein:
   said method further comprises distributing said set of encrypted restricted terms to a remote computer system; and
   said parsing, encrypting, comparing and reporting steps are performed by said remote computer system.

3. The method of claim 1, and further comprising repetitively performing the parsing, encrypting, comparing and reporting steps for a plurality of source files until all requested source files have been checked.

4. A program product comprising:
   a non-transitory computer-readable storage medium; and
   program code, stored within said non-transitory computer-readable storage medium, that when executed by a computer causes the computer to perform:
      encrypting each of plurality of restricted terms utilizing a one-way function to obtain a set of encrypted restricted terms;
      parsing plain text within a source file to identify a plurality of source file terms;
      encrypting each of the plurality of source file terms with the one-way function to obtain a plurality of encrypted source file terms;
      comparing the plurality of encrypted source file terms and the set of encrypted restricted terms to determine if the source file contains any of the plurality of restricted terms; and
      in response to determining by the comparing that the source file contains at least one restricted term among of the plurality of restricted terms, reporting the at least one of restricted term contained in the source file, wherein said reporting includes entering in a result file in plain text the at least one restricted term contained in the source file but not others of the plurality of restricted terms and including in the result file an indication of one or more locations of the at least one restricted term in the source file.

5. The program product of claim 4, wherein:
   Said program code further causes the computer to perform distributing said set of encrypted restricted terms to a remote computer system; and
   said parsing, encrypting, comparing and reporting are performed by said remote computer system.

6. The program product of claim 4, and said program code further causes the computer to repetitively perform the parsing, encrypting, comparing and reporting for a plurality of source files until all requested source files have been checked.

7. A data processing system comprising:
   a processor unit; and
   data storage coupled to the processor unit, said data storage including program code for causing the data processing system to perform:
      encrypting each of plurality of restricted terms utilizing a one-way function to obtain a set of encrypted restricted terms;
      parsing plain text within a source file to identify a plurality of source file terms;
      encrypting each of the plurality of source file terms with the one-way function to obtain a plurality of encrypted source file terms;
      comparing the plurality of encrypted source file terms and the set of encrypted restricted terms to determine if the source file contains any of the plurality of restricted terms; and
      in response to determining by the comparing that the source file contains at least one restricted term among the plurality of restricted terms, reporting the at least one restricted term contained in the source file, wherein said reporting includes entering in a result file in plain text the at least one restricted term contained in the source file but not others of the plurality of restricted terms and including in the result file an indication of one or more locations of the at least one restricted term in the source file.

8. The data processing system of claim 7, wherein:
   said program code further causes the data processing system to perform distributing said set of encrypted restricted terms to a remote computer system; and
   said parsing, encrypting, comparing and reporting steps are performed by said remote computer system.

9. The data processing system of claim 7, wherein said program code further causes the data processing system to repetitively perform the parsing, encrypting, comparing and reporting for a plurality of source files until all requested source files have been checked.

* * * * *